(12) United States Patent
Hunsaker et al.

(10) Patent No.: US 11,635,107 B1
(45) Date of Patent: Apr. 25, 2023

(54) MULTI-LINK SPHERICAL JOINT WITH COLLOCATED CENTERS OF ROTATION

(71) Applicant: United States of America as represented by the Administrator of the National Aeronautics and Space, Washington, DC (US)

(72) Inventors: Dakota Hunsaker, Houston, TX (US); Gabriel Ortiz-Sanchez, Houston, TX (US)

( * ) Notice: Subject to any disclaimer, the term of this patent is extended or adjusted under 35 U.S.C. 154(b) by 85 days.

(21) Appl. No.: 17/237,292

(22) Filed: Apr. 22, 2021

(51) Int. Cl.
*F16C 11/06* (2006.01)
*E04B 1/19* (2006.01)

(52) U.S. Cl.
CPC ........ *F16C 11/0661* (2013.01); *E04B 1/1906* (2013.01); *F16C 11/0623* (2013.01); *F16C 11/0695* (2013.01)

(58) Field of Classification Search
CPC .............. F16C 11/0623; F16C 11/0695; F16C 11/0661; E04B 1/1906; E04B 1/1903; E04B 1/585; A45B 25/02; A45B 25/06; A45B 25/10; A45B 25/14; A45B 25/165; A45B 25/22
See application file for complete search history.

(56) References Cited

U.S. PATENT DOCUMENTS

| | | | |
|---|---|---|---|
| 3,864,049 A * | 2/1975 | Ono | E02B 3/06 403/171 |
| 3,882,650 A | 5/1975 | Gugliotta | |
| 4,578,920 A | 4/1986 | Bush et al. | |
| 4,606,669 A * | 8/1986 | DeBliquy | E04B 1/1903 403/218 |
| 4,915,532 A * | 4/1990 | Radclyffe | E04B 1/1906 403/171 |
| 5,069,572 A * | 12/1991 | Niksic | F16B 7/0486 135/147 |
| 5,129,279 A | 7/1992 | Rennex | |
| 5,179,525 A | 1/1993 | Griffis et al. | |

(Continued)

FOREIGN PATENT DOCUMENTS

WO 2019/024968 A1 2/2019

OTHER PUBLICATIONS

Kovacs et al., TrussFormer: 3D Printing Large Kinetic Structures, Session 3: Fabrication, UIST 2018, Oct. 14-17, 2018, Berlin, Germany, pp. 113-125.

(Continued)

*Primary Examiner* — Daniel J Wiley
(74) *Attorney, Agent, or Firm* — David G Matthews; Edward K. Fein

(57) ABSTRACT

A joint includes a shell that is hollow and at least partially spherical. The shell includes a plurality of shell rail sections including a first shell rail section. The first shell rail section includes a portion of an outer surface of the shell, a portion of an inner surface of the shell, and an opening edge section that defines a shell opening. The joint also includes a plurality of rotatable members including a first rotatable member. The first rotatable member includes an outer cup positioned at least partially outside of the shell and having an outer track surface, and an inner cup positioned at least partially inside of the shell and having an inner track surface. The first shell rail section is positioned at least partially between the outer and inner track surfaces.

20 Claims, 13 Drawing Sheets

(56) References Cited

U.S. PATENT DOCUMENTS

| | | | |
|---|---|---|---|
| 5,186,567 A | 2/1993 | Evenson et al. | |
| 5,310,273 A | 5/1994 | Hara | |
| 5,797,191 A | 8/1998 | Ziegert | |
| 5,901,936 A | 5/1999 | Bieg | |
| 6,273,633 B1 | 8/2001 | Husson et al. | |
| 6,296,415 B1* | 10/2001 | Johnson | E04B 1/3441 135/901 |
| 6,378,265 B1* | 4/2002 | Konstandt | E04B 1/1903 403/171 |
| 6,568,871 B2 | 5/2003 | Song et al. | |
| 6,869,246 B2 | 3/2005 | Bridgers | |
| 7,178,535 B2* | 2/2007 | Eder | A45B 25/06 135/30 |
| 7,337,691 B2 | 3/2008 | Roy et al. | |
| 7,703,464 B2* | 4/2010 | Ma | A45B 25/02 135/28 |
| 8,069,872 B2* | 12/2011 | Bae | E04H 15/48 135/147 |
| 8,608,398 B2 | 12/2013 | Mekid | |
| 9,212,692 B2 | 12/2015 | Baudasse | |
| 9,841,051 B2 | 12/2017 | Graber et al. | |
| D812,292 S | 3/2018 | Moore | |
| 9,970,190 B2 | 5/2018 | Benthien et al. | |
| 10,631,603 B2* | 4/2020 | Ma | A45B 25/10 |
| 2002/0059770 A1* | 5/2002 | Fritsche | G09F 15/0062 52/645 |
| 2003/0175069 A1 | 9/2003 | Bosscher et al. | |
| 2009/0071518 A1* | 3/2009 | Amsel | A45B 25/14 135/29 |
| 2017/0350112 A1 | 12/2017 | Ventrella et al. | |
| 2018/0209474 A1 | 7/2018 | Klein et al. | |

OTHER PUBLICATIONS

Bosscher et al., A Novel Mechanism for Implementing Multiple Collocated Spherical Joints, IEEE 2003, pp. 336-341.

P C. Hughes et al, Trussarm-A Variable-Geometry-Truss Manipulator, Journal of Intelligent Material Systems and Structures, Apr. 1991, 146-160, vol. 2, Downsview. Ontqrio Ca.

S. Rost et al, On the Joint Design and Hydraulic Actuation of Octahedron VGT Robot Manipulators, Jul. 3-7, 2011, 92-97, Budapest, Hungary.

A Sofla et al, A rotational joint for shape morphing space truss structures, IOP Publishing Smart Materials and Structures 16(2007)1277-1284, Charlottesville, VA.

* cited by examiner

US 11,635,107 B1

MULTI-LINK SPHERICAL JOINT WITH COLLOCATED CENTERS OF ROTATION

ORIGIN OF THE INVENTION

The invention described herein was made by employee(s) of the United States Government and may be manufactured and used by or for the Government of the United States of America for governmental purposes without the payment of any royalties thereon or therefor. Further, the invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND

A spherical joint (also referred to as a ball joint) is used for allowing free rotation in two planes at the same time while preventing translation in any direction, including rotating in those planes. Combining two such joints with control arms enables motion in all three planes. One type of spherical joint is a spherical rolling joint, which is a high-precision joint that includes a spherical outer and inner race separated by ball bearings. The ball bearings are housed in a spherical retainer and roll along both the inner and outer surfaces. This design allows the joint to have very low friction while maintaining a large range of motion.

A spherical joint may be used to build a truss. However, trusses built with conventional spherical joints are unstable and uncontrollable. For example, such trusses may not handle the loads of actuators. In addition, the positions of some linkages may be dependent upon the position of other linkages. Therefore, it would be desirable to have an improved spherical joint, which may facilitate building trusses that solve one or more of the foregoing problems.

SUMMARY

A joint is disclosed. The joint may include a shell that is hollow and at least partially spherical. The shell includes a plurality of shell rail sections including a first shell rail section. The first shell rail section includes a portion of an outer surface of the shell, a portion of an inner surface of the shell, and an opening edge section that defines a shell opening. The joint also includes a plurality of rotatable members including a first rotatable member. The first rotatable member includes an outer cup positioned at least partially outside of the shell and having an outer track surface, and an inner cup positioned at least partially inside of the shell and having an inner track surface. The first shell rail section is positioned at least partially between the outer and inner track surfaces. The first rotatable member is configured to move along a first arcuate path with respect to the shell while a central longitudinal axis through the first rotatable member remains extending through a center of the shell.

A spherical joint is also disclosed. The spherical joint includes a shell that is hollow and at least partially spherical. The shell includes a first shell section and a second shell section that are configured to be coupled together. The shell also includes a plurality of shell rail sections including a first shell rail section. The first shell rail section includes a portion of an outer surface of the shell, a portion of an inner surface of the shell, and a first opening edge section that defines a first shell opening. The spherical joint also includes a plurality of rotatable members including a first rotatable member. The first rotatable member includes a first outer cup positioned at least partially outside of the shell and having an outer track surface. The outer track surface is at least partially spherical and comprises a radius that is substantially the same as a radius of the outer surface of the shell. The first rotatable member also includes a first inner cup positioned at least partially inside of the shell and having an inner track surface. The inner track surface is at least partially spherical and comprises a radius that is substantially the same as a radius of the inner surface of the shell. A diameter of the first inner cup is greater than a diameter of the first shell opening such that the first inner cup is configured to be inserted into an interior of the shell prior to the first and second shell sections being coupled together. The first rotatable member also includes a first cup connector portion extending through the first shell opening and coupling the first outer cup and the first inner cup together. The first rotatable member also includes a first rotatable member connector portion configured to couple the first rotatable member to an elongated member. The first shell rail section is positioned at least partially between the outer and inner track surfaces. The first rotatable member is configured to move along a first arcuate path with respect to the shell while a central longitudinal axis through the first rotatable member remains extending through a center of the shell.

A truss structure is also disclosed. The truss structure includes a plurality of joints including a first joint. Each joint includes a shell that is hollow and at least partially spherical. The shell includes a plurality of shell rail sections including a first shell rail section and a second rail section. The first and second shell rail sections each include a portion of an outer surface of the shell, a portion of an inner surface of the shell, and an opening edge section that defines a shell opening. Each joint also includes a plurality of rotatable members including a first rotatable member and a second rotatable member. The first rotatable member is configured to move along a first arcuate path with respect to the shell while a central longitudinal axis through the first rotatable member remains extending through a center of the shell. The second rotatable member is configured to move along a second arcuate path with respect to the shell while a central longitudinal axis through the second rotatable member remains extending through the center of the shell. The first and second rotatable members each include an outer cup positioned at least partially outside of the shell and having an outer track surface. The first and second rotatable members each include an inner cup positioned at least partially inside of the shell and having an inner track surface. The first shell rail section is positioned at least partially between the outer and inner track surfaces of the first rotatable member, and the second shell rail section is positioned at least partially between the outer and inner track surfaces of the second rotatable member. The truss structure also includes a plurality of actuators including a first actuator and a second actuator. The first actuator is coupled to the outer cup of the first rotatable member of the first joint. The first actuator is configured to extend and retract. The first rotatable member of the first joint and the first actuator are configured to move with respect to the shell of the first joint while the central longitudinal axis through first rotatable member of the first joint and the first actuator remains extending through the center of the shell of the first joint. The second actuator is coupled to the outer cup of the second rotatable member of the first joint. The second actuator is configured to extend and retract. The second rotatable member of the first joint and the second actuator are configured to move with respect to the shell of the first joint while the central longitudinal axis through second rotatable member of the first joint and the second actuator remains extending through the center of the shell of the first joint.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein.

DETAILED DESCRIPTION

Reference may now be made in detail to specific embodiments illustrated in the accompanying drawings and figures. In the following detailed description, numerous specific details are set forth in order to provide a thorough understanding of the embodiments described herein. However, it may be apparent to one of ordinary skill in the art that other embodiments may be practiced without these specific details. In other instances, well-known methods, procedures, components, circuits, and networks have not been described in detail so as not to unnecessarily obscure aspects of the embodiments.

It may also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It may also be understood that the term "and/or" as used herein refers to and encompasses any and possible combinations of one or more of the associated listed items. It may be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Figure 1:
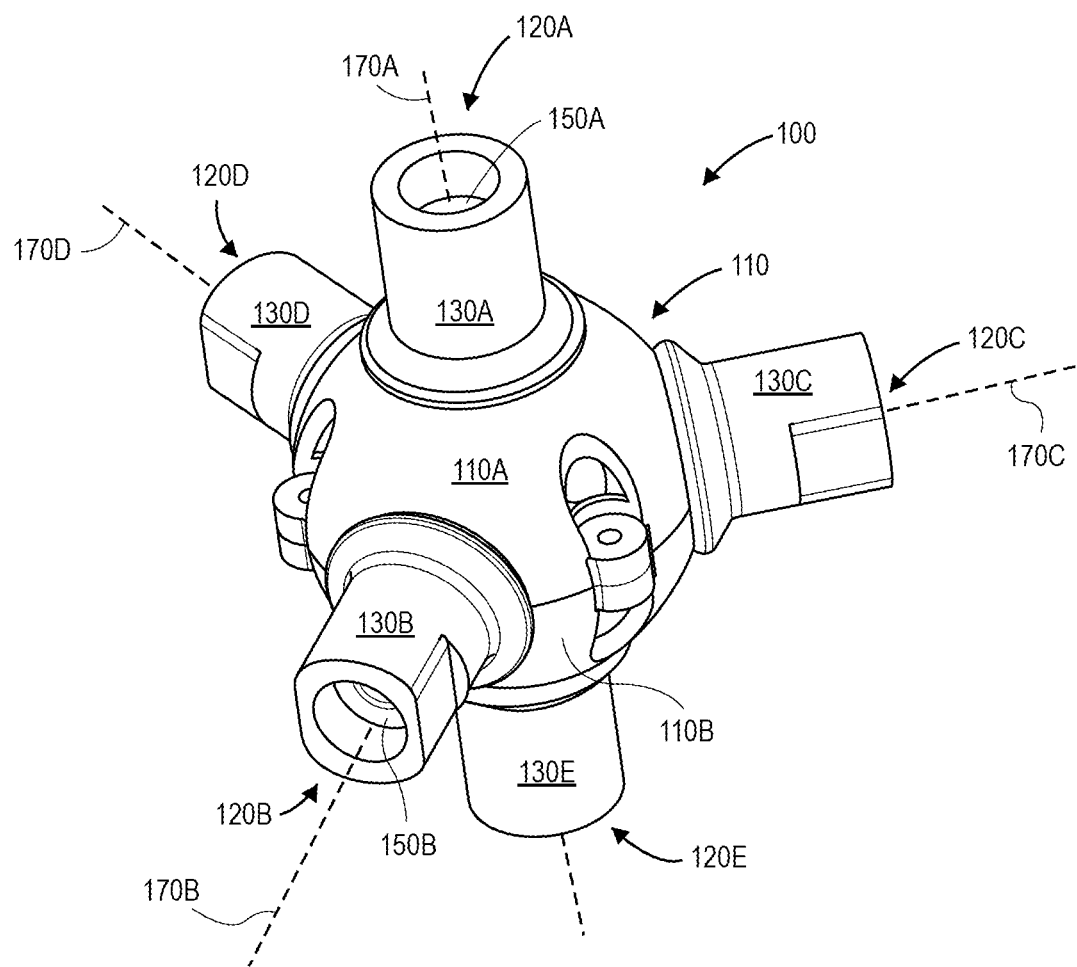
FIG. 1 illustrates a perspective view of a spherical joint, according to an embodiment.

FIG. 1 illustrates a perspective view of a spherical joint 100, according to an embodiment. The spherical joint 100 may include a shell (also referred to as a housing) 110. The shell 110 may be at least partially hollow. The shell 110 may be at least partially spherical. Thus, the shell 110 may include an outer shell surface that is at least partially spherical and an inner shell surface that is at least partially spherical. The shell 110 may be or include a single, integral component; however, in the embodiment shown, the shell 110 includes a first (e.g., upper) shell section 110A and a second (e.g., lower) shell section 110B, which may be coupled together. Having two or more shell sections (e.g., halves) 110A, 110B may facilitate assembly of the spherical joint 100, as described below.

The spherical joint 100 may also include one or more rotatable members (five are shown: 120A-120E). The rotatable members 120A-120E may extend radially through corresponding openings in the shell 110. The rotatable members 120A-120E may be spaced apart from one another by an angle that is from about 60° to about 180°, about 75° to about 150°, or about 90° to about 120°. As shown, the adjacent rotatable members 120A, 120B are spaced apart from one another in a first (e.g., vertical) plane by about 90°, and the adjacent rotatable members 120B-120D are spaced apart from one another in a second (e.g., horizontal) plane by about 120°. The spherical joint 100 (e.g., the rotatable members 120A-120E) may not use or include ball bearings to facilitate movement (e.g., rotation).

Each rotatable member 120A-120E may include an outer portion (five are shown: 130A-130E). The outer portions 130A-130E may also be referred to as outer cups. The outer cups 130A-130E may be positioned at least partially radially outward from the shell 110. The outer cups 130A-130E may be configured to receive/withstand a compression load (e.g., a load directed inward toward the shell 110) without passing through the opening in the shell 110.

Each rotatable member 120A-120E may include an inner portion (two are shown in FIG. 1: 150A, 150B). The inner portions 150A, 150B may also be referred to as inner cups. The inner cups 150A, 150B may be positioned at least partially radially inward from the shell 110. The inner cups 150A, 150B may be configured to receive/withstand a tension load (e.g., a load directed away from the shell 110) without passing through the opening in the shell 110. Each inner cup 150A, 150B may be coupled to the corresponding outer cup 130A-130E. For example, a portion of each inner cup 150A, 150B may extend radially through the corresponding opening in the shell 110 and be coupled to the corresponding outer cup 130A-130E. This is described in greater detail below.

Each rotatable member 120A-120E may have a central longitudinal axis 170A-170E extending therethrough. Thus, the cups 130A, 150A may have the axis 170A extending therethrough, the cups 130B, 150B may have the axis 170B extending therethrough, and so on. The axes 170A-170E may intersect one another inside the shell 110. More particularly, the axes 170A-170E may intersect one another at a center point of the shell 110 (e.g., a center of the sphere).

The rotatable members 120A-120E may be configured to move (e.g., independently of one another) with respect to the shell 110. More particularly, the outer cups 130A-130E and their corresponding inner cups 150A, 150B may be configured to move together with respect to the shell 110, such that the axes 170A-170B are configured to tilt (e.g., around the center point of the shell 110) in any direction by an angle. The angle may be from about 1° to about 5°, about 5° to about 10°, about 10° to about 20°, about 20° to about 45°, or more. This is described in greater detail below. Even when the rotatable members 120A-120E move with respect to the shell 110, their axes 170A-170E may still extend through (e.g., intersect) the center point of the shell 110.

Figure 2:
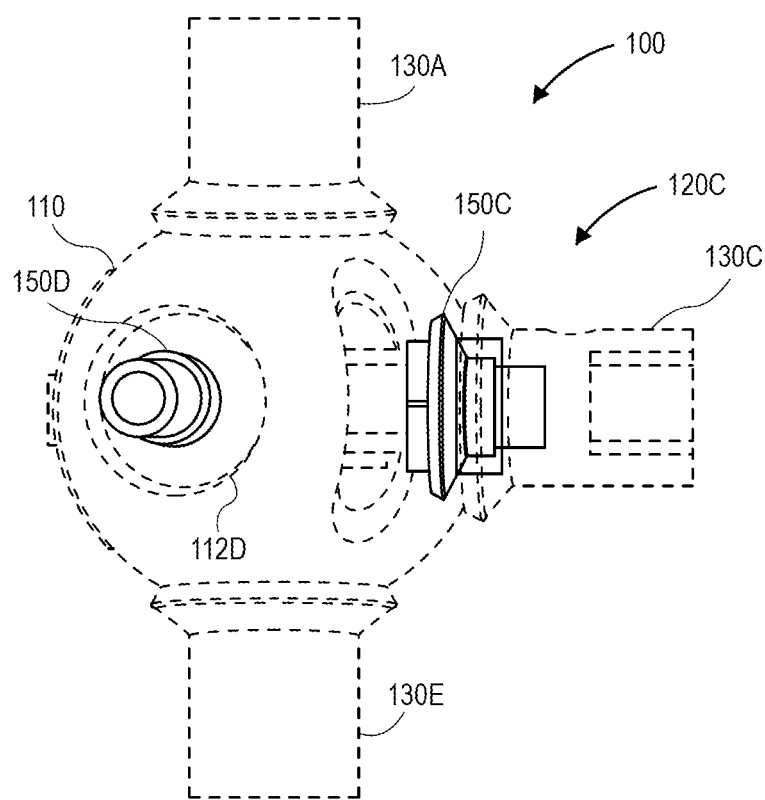
FIG. 2 illustrates a transparent perspective side view of the spherical joint, according to an embodiment.

FIG. 2 illustrates a transparent perspective side view of the spherical joint 100, according to an embodiment. This view shows the outer cup 130C coupled to the corresponding inner cup 150C. More particularly, the inner cup 150C extends through the opening in the shell 110 and at least partially into the outer cup 130C. In one embodiment, the cups 130C, 150C may be screwed together. The outer cups 130A, 130E are not transparent in FIG. 2, and thus, their corresponding inner cups may not be seen. The outer cup 130D has been omitted from FIG. 2 to more clearly illustrate the inner cup 150D extending through the opening 112D in the shell 110 (also referred to as shell opening 112D).

Figure 3:
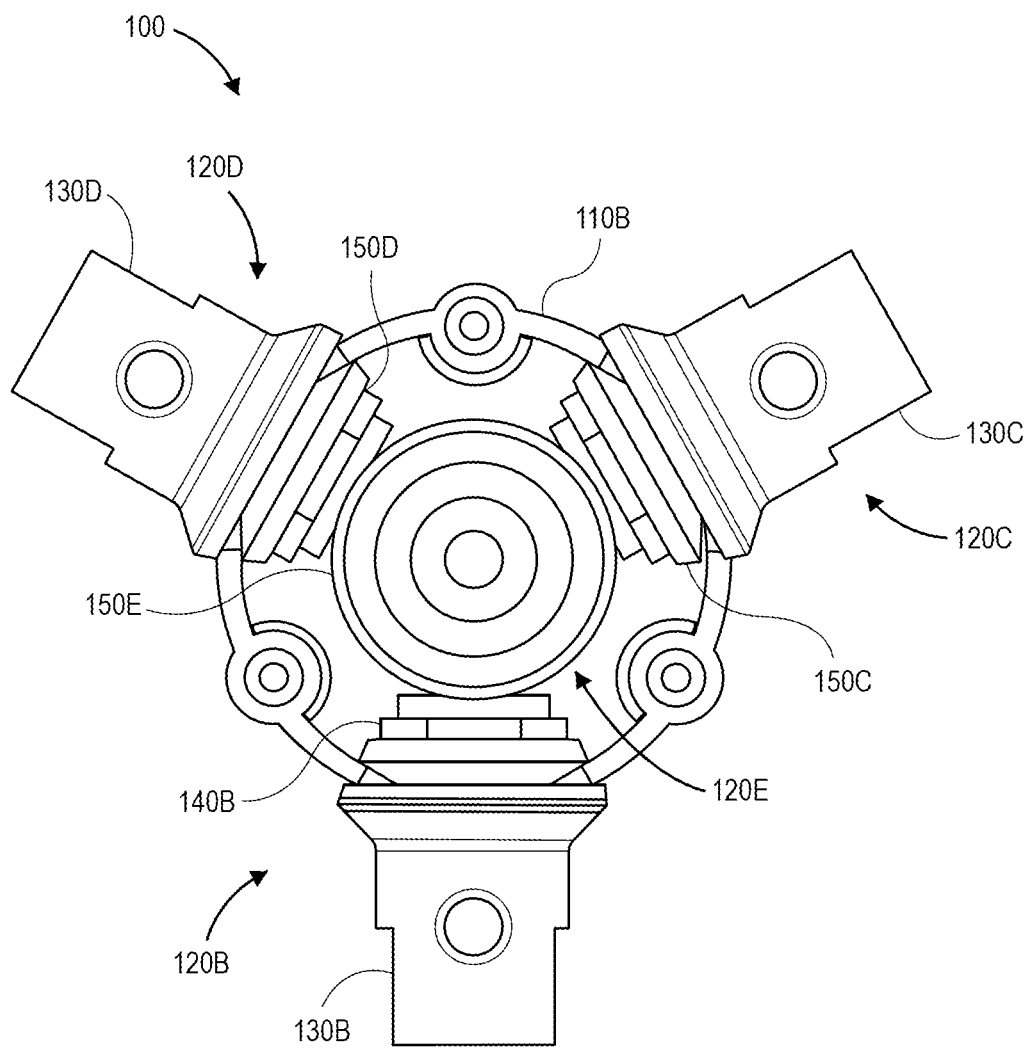
FIG. 3 illustrates a top view of the spherical joint, according to an embodiment.

FIG. 3 illustrates a top view of the spherical joint 100 with the upper shell section 110A of the shell 110 and the rotatable member 120A removed for clarity, according to an embodiment. Thus, the lower portion 110B of the shell 110 and the rotatable members 120B-120E are shown. Each rotatable member 120B-120E shown in FIG. 3 has the outer cup 130B-130E coupled to the corresponding inner cup 150B-150E.

Figure 4A:
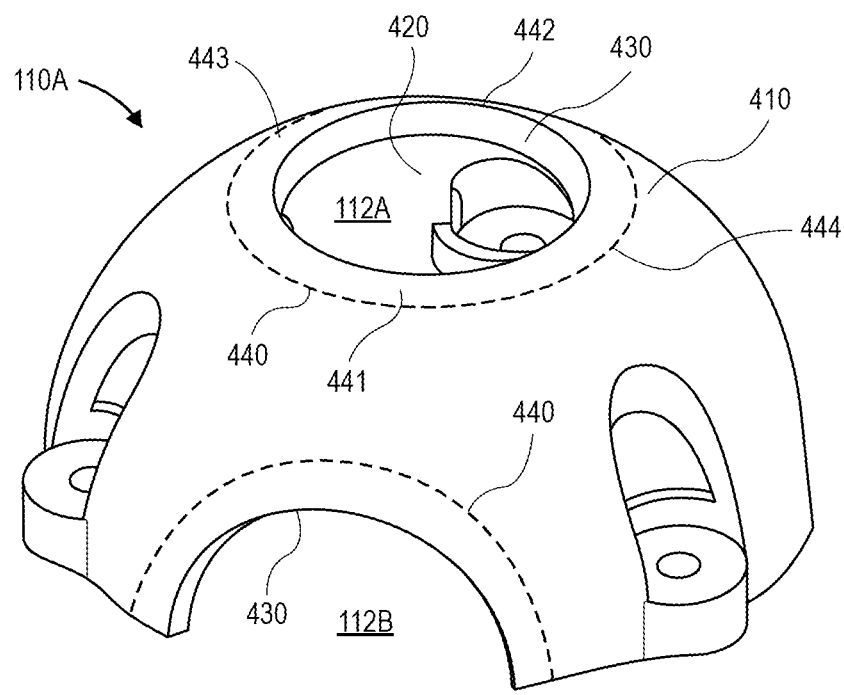
FIGS. 4A and 4B illustrate perspective views of a shell of the spherical joint, according to an embodiment.
Figure 4B:
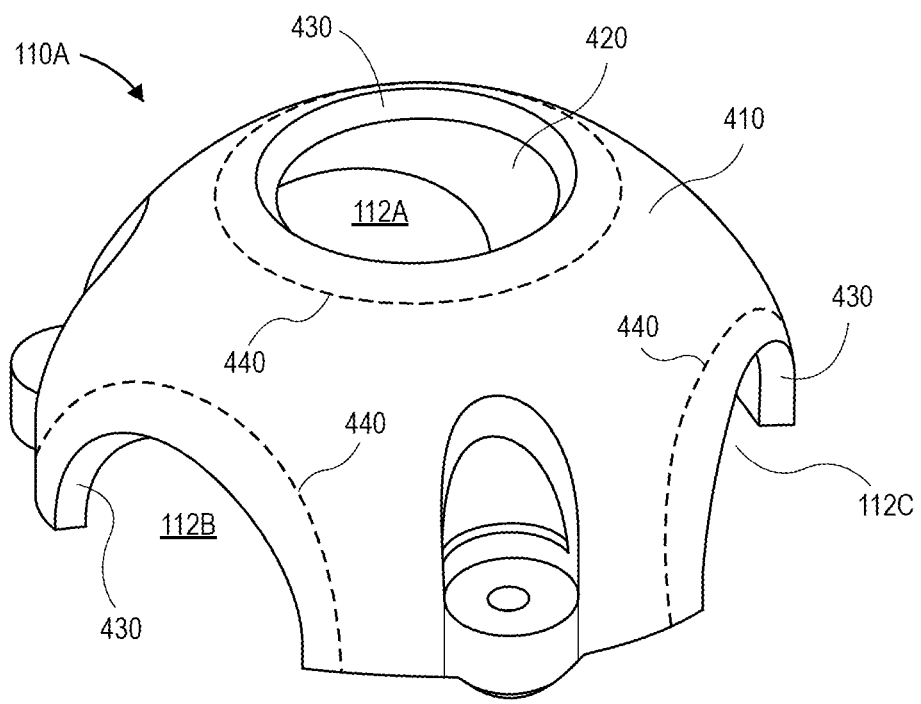

FIGS. 4A and 4B illustrate exploded perspective views of the upper shell section 110A of the shell 110, according to an embodiment. The upper shell section 110A has been rotated slightly from FIG. 4A to FIG. 4B. The lower shell section 110B may be substantially the same as the upper shell section 110A (e.g., a mirror image).

As mentioned above, the upper shell section 110A may be substantially spherical and hollow. Thus, the upper shell section 110A may include an outer shell surface 410 that is at least partially spherical, and an inner shell surface 420 that is at least partially spherical. The upper shell section 110A may also include one or more opening edge sections 430 that at least partially define one or more openings (three are shown: 112A-112C) in the upper shell section 110A. As mentioned above, the rotatable members 120A-120C may extend through the openings 112A-112C.

A shell rail (shown by the dashed lines 440) may be disposed at least partially around each opening edge section 430 and/or opening 112A-112C. As discussed below, each set of outer and inner cups 130A-130E, 150E-150E may have one of the shell rails 440 positioned at least partially therebetween.

The rotatable members 120A-120E may each have one or more rotatable configurations. For example, the rotatable member 120A (not shown in FIGS. 4A and 4B), which extends through the opening 112A, may be configured to move along a first actuate path from a first position where the rotatable member 120A is tilted toward a first rail location 441 to a second position where the rotatable member 120A is tilted toward a second rail location. The rotatable member 120A may also be configured to move along a second actuate path from a third position where the rotatable member 120A is tilted toward a third rail location 443 to a fourth position where the rotatable member 120A is tilted toward a fourth rail location 444. The first and second arcuate paths may be substantially perpendicular to one another. The rotatable member 120A may also be configured to move along a third arcuate path such that the axis 170A through the rotatable member 120A circles/revolves around a center of the opening 112A. The axis 170A through the rotatable member 120A may remain extending through a center point of the spherical shell 110 as the rotatable member 120A moves through the arcuate path(s).

Figure 5A:
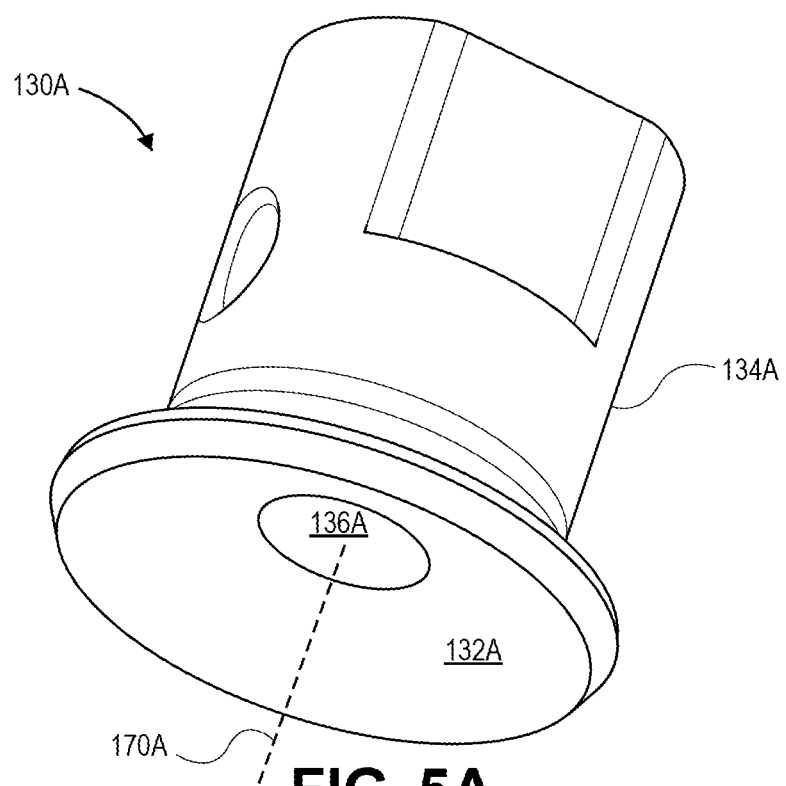
FIGS. 5A and 5B illustrate perspective views of an outer portion (also referred to as an outer cup) of the spherical joint, according to an embodiment.
Figure 5B:
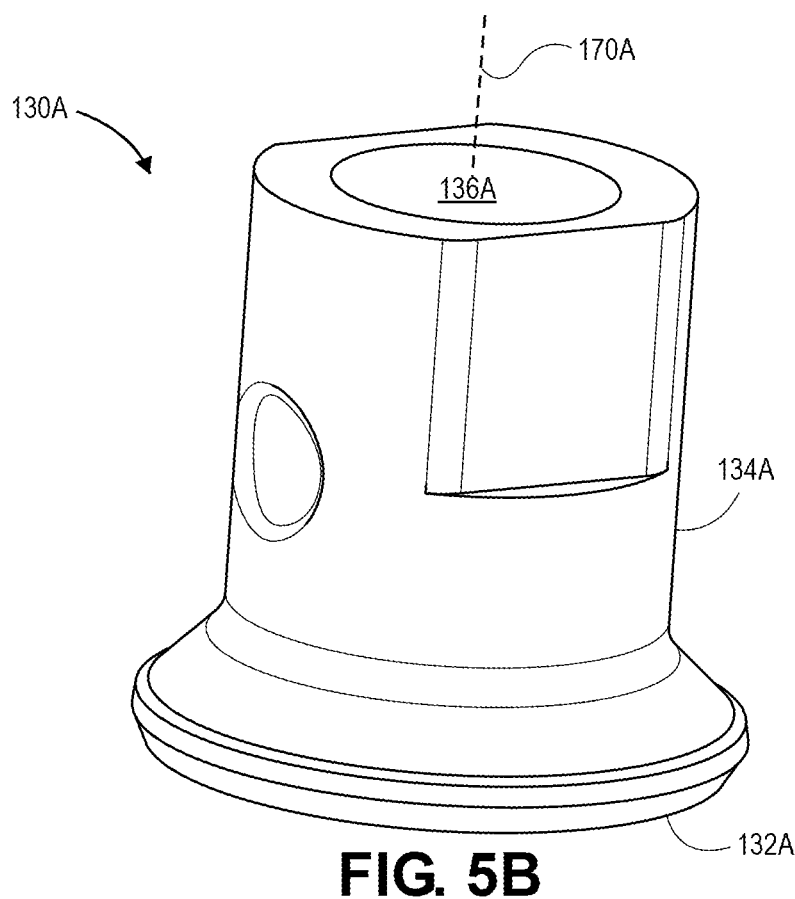

FIGS. 5A and 5B illustrate perspective views of the outer cup 130A of the rotatable member 120A, according to an embodiment. The other outer cups 130B-130E may be the same as the outer cup 130A. The outer cup 130A may include an inner surface (also referred to as an outer track surface) 132A. The inner surface 132A may be at least partially spherical such that it is configured to conform to the outer surface of the shell 110. The outer cup 130A may also include a sleeve 134A that extends (e.g., outward) from the inner surface 132A. Thus, when the inner surface 132A contacts the outer surface of the shell 110, the sleeve 134A may extend radially outward and away from the shell 110. A bore 136A may extend through the outer cup 130A (e.g., through the inner surface 132A and the sleeve 134A). The axis 170A may extend through the inner surface 132A, the sleeve 134A, and the bore 136A.

Figure 6A:
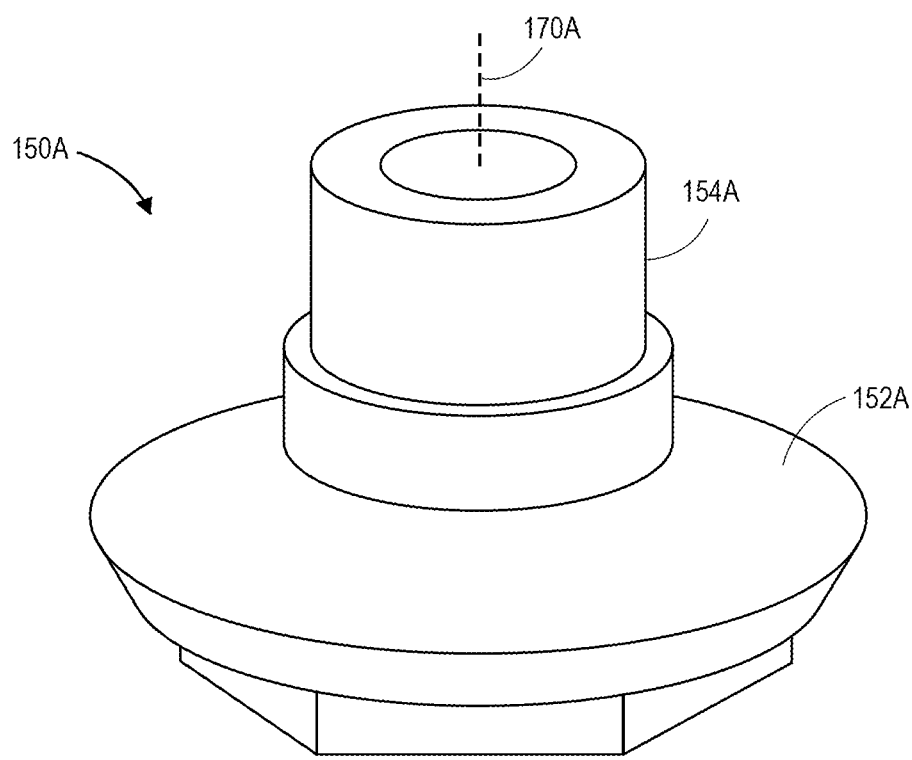
FIGS. 6A and 6B illustrate perspective views of an inner portion (also referred to as an inner cup) of the spherical joint, according to an embodiment.
Figure 6B:
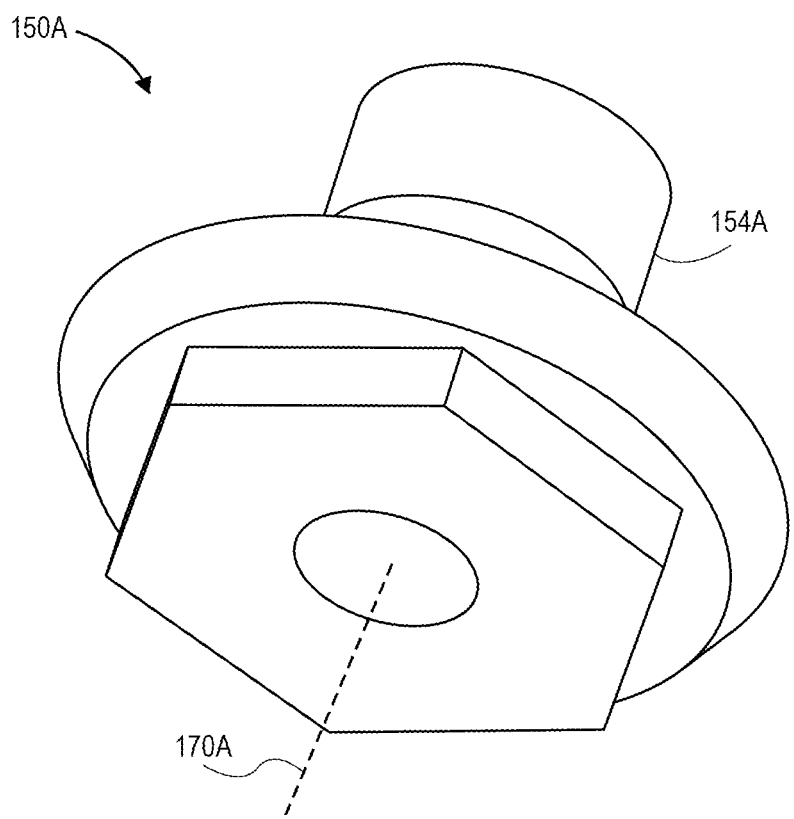

FIGS. 6A and 6B illustrate perspective views of the inner cup 150A of the rotatable member 120A, according to an embodiment. The other inner cups 150B-150E may be the same as the inner cup 150A. The inner cup 150A may include an outer surface (also referred to as an inner track surface) 152A. The outer surface 152A may be at least partially spherical such that it is configured to conform to the inner surface of the shell 110. The inner cup 150A may also include an arm (also referred to as a cup connector portion) 154A that extends (e.g., outward) from the outer surface 152A. Thus, when the outer surface 152A contacts the inner surface of the shell 110, the arm 154A may extend radially outward through the opening 112A in the shell 110 and at least partially into the outer cup 130A. A bore 156A may extend through the inner cup 150A (e.g., through the outer surface 152A and the arm 154A). The axis 170A may extend through the outer surface 152A, the arm 154A, and the bore 156A. As discussed below, the bores 136A, 156A may be aligned and configured to have one or more cables (e.g., power and/or communication cables) extending therethrough.

Figure 7A:
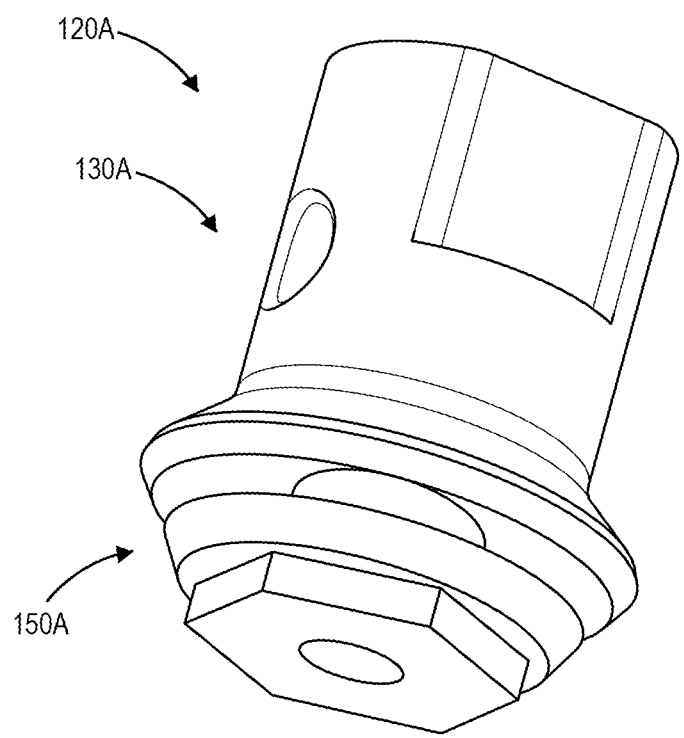
FIGS. 7A and 7B illustrate perspective views of the inner and outer cups coupled together, according to an embodiment.
Figure 7B:
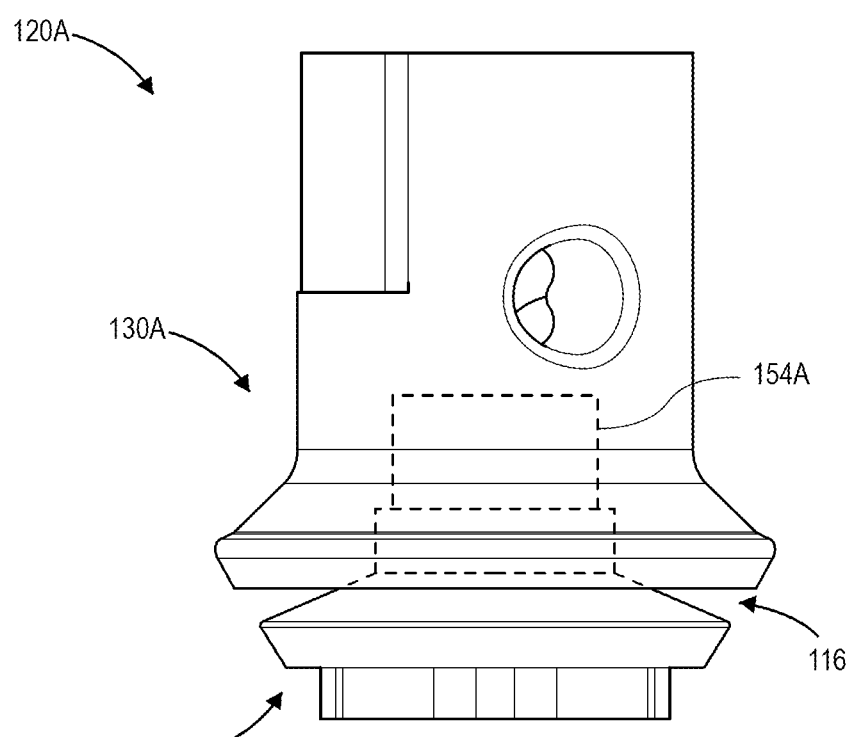

FIGS. 7A and 7B illustrate perspective views of the rotatable member 120A, according to an embodiment. More particularly, FIGS. 7A and 7B illustrate the outer and inner cups 130A, 150A coupled together. The inner cup 150A may be configured to be positioned at least partially within the outer cup 130A. For example, the arm 154A of the inner cup 150A may be configured to be positioned at least partially within the bore 136A of the outer cup 130A. In one embodiment, the arm 154A may have external threads that may couple with corresponding internal threads on the outer cup 130A.

As shown in FIG. 7B, the outer and inner cups 130A, 150A may form a gap therebetween, which may serve as a track 116. At least a portion of the shell 110 (e.g., the shell rail 440) may be positioned within the track 116.

Figure 8:
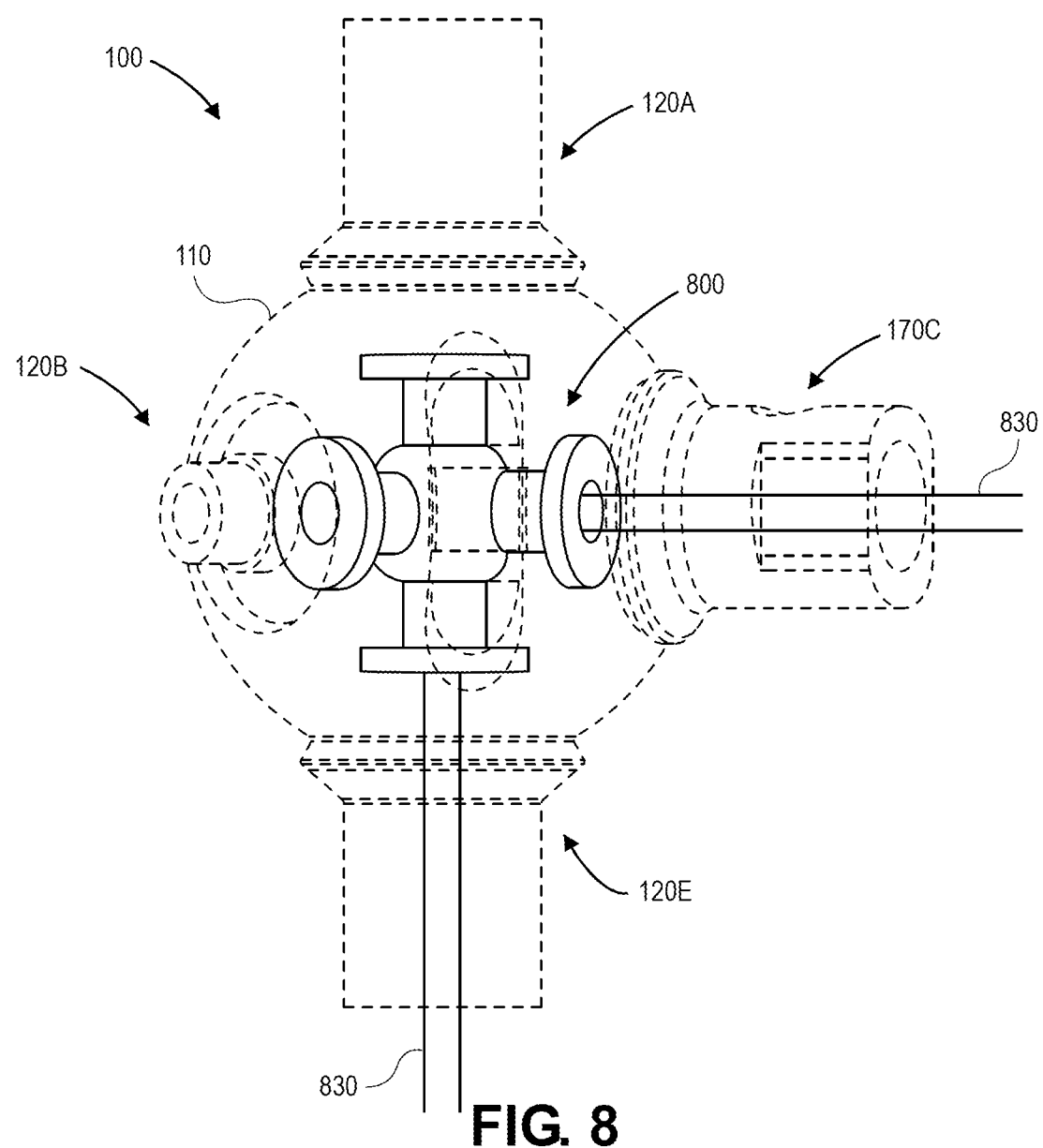
FIG. 8 illustrates a transparent perspective side view of the spherical joint having a cable guide positioned therein, according to an embodiment.
Figure 9:
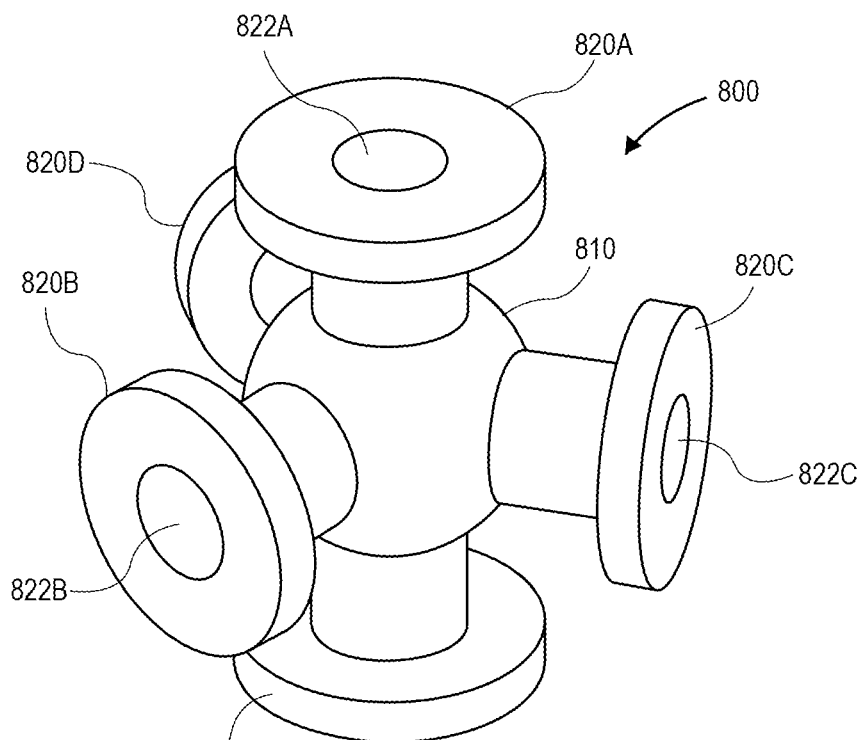
FIG. 9 illustrates a perspective view of the cable guide, according to an embodiment.

FIG. 8 illustrates a transparent perspective side view of the spherical joint 100 having a cable guide 800 positioned therein, and FIG. 9 illustrates a perspective view of the cable guide 800, according to an embodiment. The cable guide 800 may be configured to be positioned at least partially within the shell 110. The cable guide 800 may include a hollow body 810 and one or more protrusions (five are shown: 820A-820E) that extend radially outward from the body 810. The protrusions 820A-820E may be substantially aligned with the rotatable members 120A-120E. More particularly, the protrusions 820A-820E may be substantially aligned with the outer portions 130A-130E and/or the corresponding inner portions 150A-150E. Each protrusion 820A-820E may have a bore (three are shown: 822A-822C) extending therethrough.

One or more cables (one is shown: 830) may extend at least partially through the spherical joint 100. The cable guide 800 may be flexible (e.g., elastic). The cable guide 800 may serve to direct and protect the cable 830. For example, the cable guide 800 may prevent the cable 830 from being caught or tangled in response to the movement of the rotatable members 120A-120E. The cable guide 800 may also or instead prevent the rotatable members 120A-120E from rotating about their axes, which could twist the cable 830.

In the example shown in FIG. 8, the cable 830 extends through the rotatable member 120C (e.g., the outer and inner cups 130C, 140C) and into the interior of the shell 110. The cable 830 then extends through the protrusion 820C and into the interior of the body 810 of the cable guide 800. The cable 830 then extends through the protrusion 820E and out the rotatable member 120E (e.g., the outer and inner cups 130E, 150E). This is merely one example of how the cable 830 may be routed. In another embodiment, the cable 830 may be routed through the spherical joint 100 without the use of the cable guide 800 (i.e., the cable guide 800 may be omitted).

Figure 10:
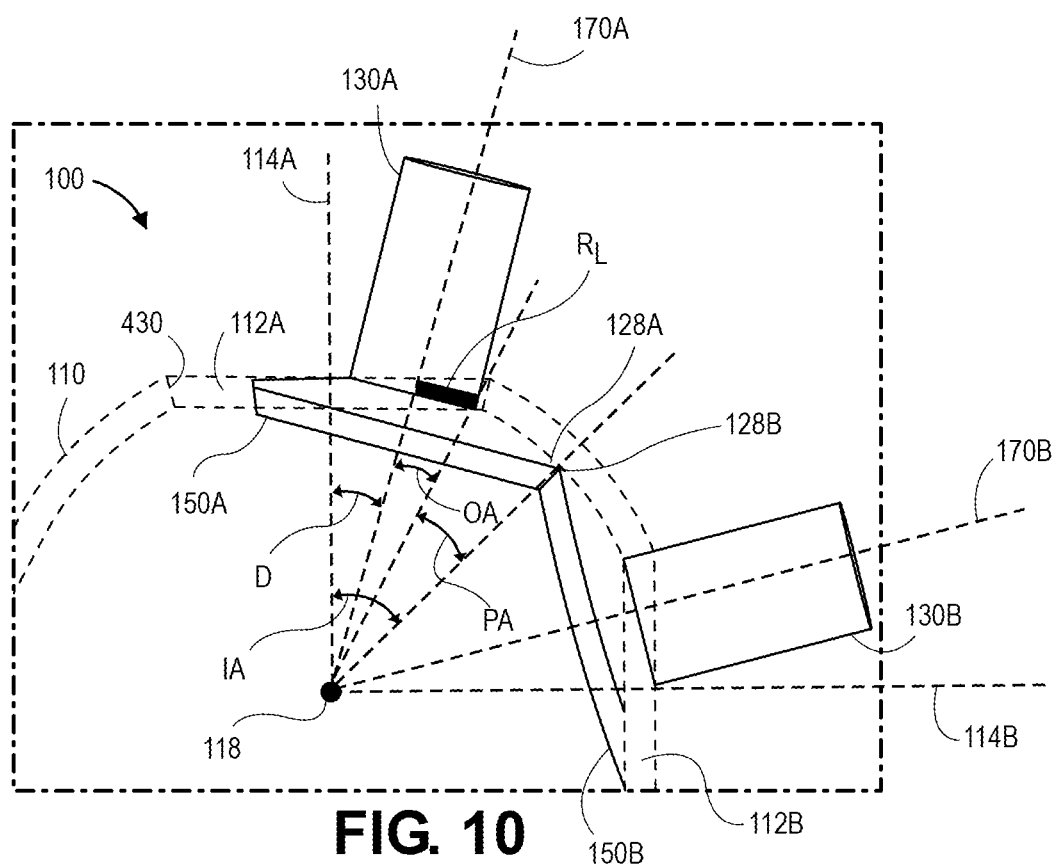
FIG. 10 illustrates a transparent perspective view of the spherical joint, according to an embodiment.

FIG. 10 illustrates a transparent perspective view of the spherical joint 100, according to an embodiment. As mentioned above, the rotatable members 120A-120E may be configured to move with respect to the shell 110. FIG. 10 illustrates the movement (e.g., rotation) of the rotatable members 120A-120E. The axes 114A, 114B extend through the centers of the openings 112A, 112B in the shell 110, and the axes 170A, 170B extend through the centers of the rotatable members 120A, 120B. More particularly, the axis 170A extends through the centers of the cups 130A, 150A, and the axis 170B extends through the centers of the cups 130B, 150B. The axes 114A, 114B and the axes 170A, 170B may extend through a center point 118 of the shell 110. The center point 118 may be a shared center of rotation for the rotatable members 120A-120E. In other words, the rotatable members 120A-120E may be configured to move (e.g., independently from one another) about the center point 118 with respect to the shell 110, and the axes 170A-170E will remain extending through the center point 118 as the rotatable members 120A-120E rotate.

The angle D represents the degree of angular freedom of the rotatable member 120A. The degree of angular freedom D is the angle between the axis 114A through the opening 112A and the axis 170A through the rotatable member 120A (e.g., when the rotatable member 120A has been rotated to the maximum extent allowable). The other rotatable members 120B-120E may have similar degrees of angular freedom D. The degree of angular freedom D may be from about 1° to about 5°, about 5° to about 10°, about 10° to about 20°, about 20° to about 45°, or more.

The angle OA represents the opening angle. The opening angle OA is the angle between the axis 114A through the center of the opening 112A and the opening edge section 430 of the opening 112A. The other openings 112B-112E may have a similar OA.

The angle IA represents the interference angle. When two adjacent rotatable members 120A, 120B are rotated toward one another, they may contact one another. More particularly, as shown in FIG. 10, the inner cups 150A, 150B may have contact points 128A, 128B that contact one another. The interference angle IA represents the angle between the axis 114A through the opening 112A and the contact point 128A on the rotatable member 120A (e.g., the inner cup 150A) when the rotatable members 120A, 120B are rotated toward one another such that the contact points 128A, 128B are contacting one another. For example, the openings 112A, 112B may be spaced apart from one another by about 90°. Thus, the contact points 128A, 128B may contact one another when the inner cups 150B, 150B are each rotated toward one another by 45° (i.e., the interference angle (IA)), which adds up to 90°.

The angle PA represents the pullout angle. The pullout angle PA is the angle between the opening edge section 430 of the opening 112A and the contact point 128A on the rotatable member 120A (e.g., the inner cup 150A) when the rotatable members 120A, 120B are rotated toward one another such that the contact points 128A, 128B are contacting one another. The pullout angle PA may be sized to help prevent the cups 130A, 150A from being "pulled" through the opening 112A. More particularly, the outer cup 130A may be slightly larger than the opening 112A such that it may not be pushed through the opening 112A during a compression load, and the inner cup 150A may be slightly larger than the opening 112A such that it may not be pulled out through the opening 112A during a tension load. For example, the cups 130A, 150A may have diameters that are larger than the diameter of the opening 112A. Thus, the cups 130A, 150A may not fully cover the opening 112A at all times, as may be seen on the left side of the opening 112A, where a gap exists.

As mentioned above, the shell 110 may include two or more shell sections 110A, 110B. As the inner cups 150A-150E may not be inserted into the interior of the shell 110 through the openings 112A-112E, they may instead be inserted into the interior of the shell 110 when the shell sections 110A, 110B are apart. Once the inner cups 150A-150E are in the interior of the shell 110, the shell sections 110A, 110B may be coupled together.

The link radius $r_L$ represents the radius of the sleeve 134A of the outer cup 130A and/or the radius of the arm 154A of the inner cup 150A. The sphere radius $r_S$ (not shown in FIG. 10) represents the radius of the shell 110 (e.g., from the center point 118 to the outer surface 410 and/or the inner surface 420 of the shell 110.

The triangle between the degree of angular freedom D, opening angle OA, and link radius $r_L$ links the angular variables and dimensions of the spherical joint 100. By replacing the opening angle OA with $\arcsin(r_L/r_S)$ and solving for the sphere radius $r_S$, this leads to:

$$r_S = \frac{r_L}{\sin(CA - D - PA)} \qquad \text{Equation 1}$$

Once the final angles are derived, the minimum radius of the shell 110 may be calculated, minimizing the size of the spherical joint 100. The link radius $r_L$ may be based at least partially upon (e.g., derived directly from) a tension load. Equation 1 may allow for the shell 110 to be sized based upon on the load requirement of the rotatable members 120A-120E.

Example

The spherical joint 100 may be made out of aluminum 7075. The degree of angular freedom D may be 15° (allowing for 30° of total travel). The bore 156A through the inner cup 150A may be 0.25 inches. The pullout angle PA may be 2° larger than the opening angle OA to prevent the rotatable member 120A from being pulled out through the opening 112A. The load on the rotatable member 120A may be 1500 lbs. If the opposing rotatable member 120E experiences a load of 1500 lbs in the opposite direction, the rotatable member 120A may experience 3000 lbs of force. The factor of safety (FOS) off of yield may be 1.25.

| | |
|---|---|
| Yield strength=73,000 psi/1.25=58,400 psi | Equation 2 |
| Stress=$F/A$ | Equation 3 |
| 58,400 psi=3000 lb/$A$ | Equation 4 |
| $A$=0.05137 in$^2$ | Equation 5 |
| $A=\pi r_L^2 - \pi(0.25)^2 = 0.05137$ in$^2$ | Equation 6 |
| Link radius $r_L$=0.281 inches | Equation 7 |

Plug this into equation 1:

$$r_S = \frac{0.281}{\sin(45 - 15 - (15 + 2))} = 1.248 \text{ inches} \qquad \text{Equation 8}$$

Thus, the shell 110 may have a diameter of about 2.5 inches.

Figure 11:
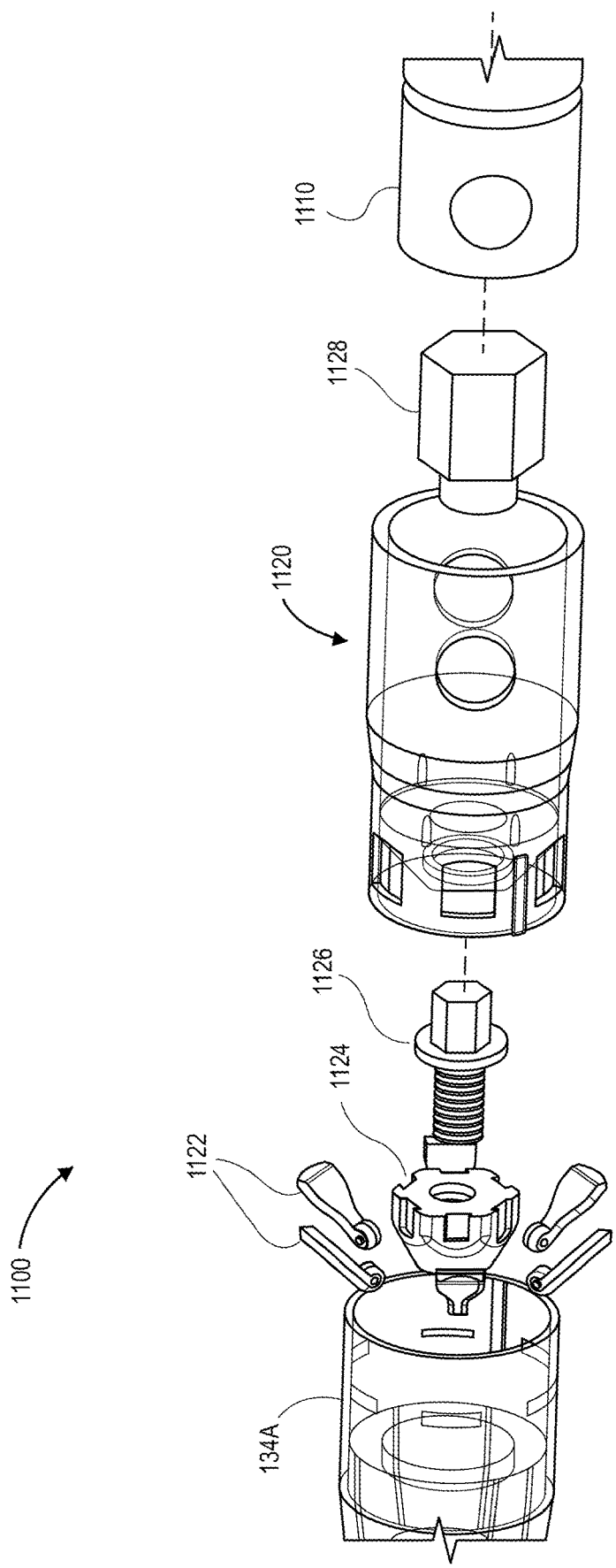
FIG. 11 illustrates an exploded perspective view of a rotatable member connector portion that may be coupled to the spherical joint, according to an embodiment.

FIG. 11 illustrates an exploded perspective view of a rotatable member connector portion 1100 that may be coupled to the spherical joint 100, according to an embodiment. Each rotatable member 120A-120E may be configured to be coupled to an elongated member 1110. The elongated member 1110 may be or include a linear actuator that is configured to extend and retract to vary the length thereof. As shown, the sleeve 134A of the outer cup 130A of the rotatable member 130A may be configured to be coupled to the linear actuator 1110.

In the embodiment shown, the sleeve 134A may be coupled to the actuator 1110 via a guide nut 1120. The sleeve 134A may be coupled to the guide nut 1120A via one or more radial links (six are shown: 1122), a hinge nut 1124, and a bolt 1126. The radial links 1122 may be circumferentially offset from one another around the axis 170A. A bolt head 1128 may be configured to couple to the bolt 1126. This may couple the guide nut 1120 to the actuator 1110.

Figure 12A:
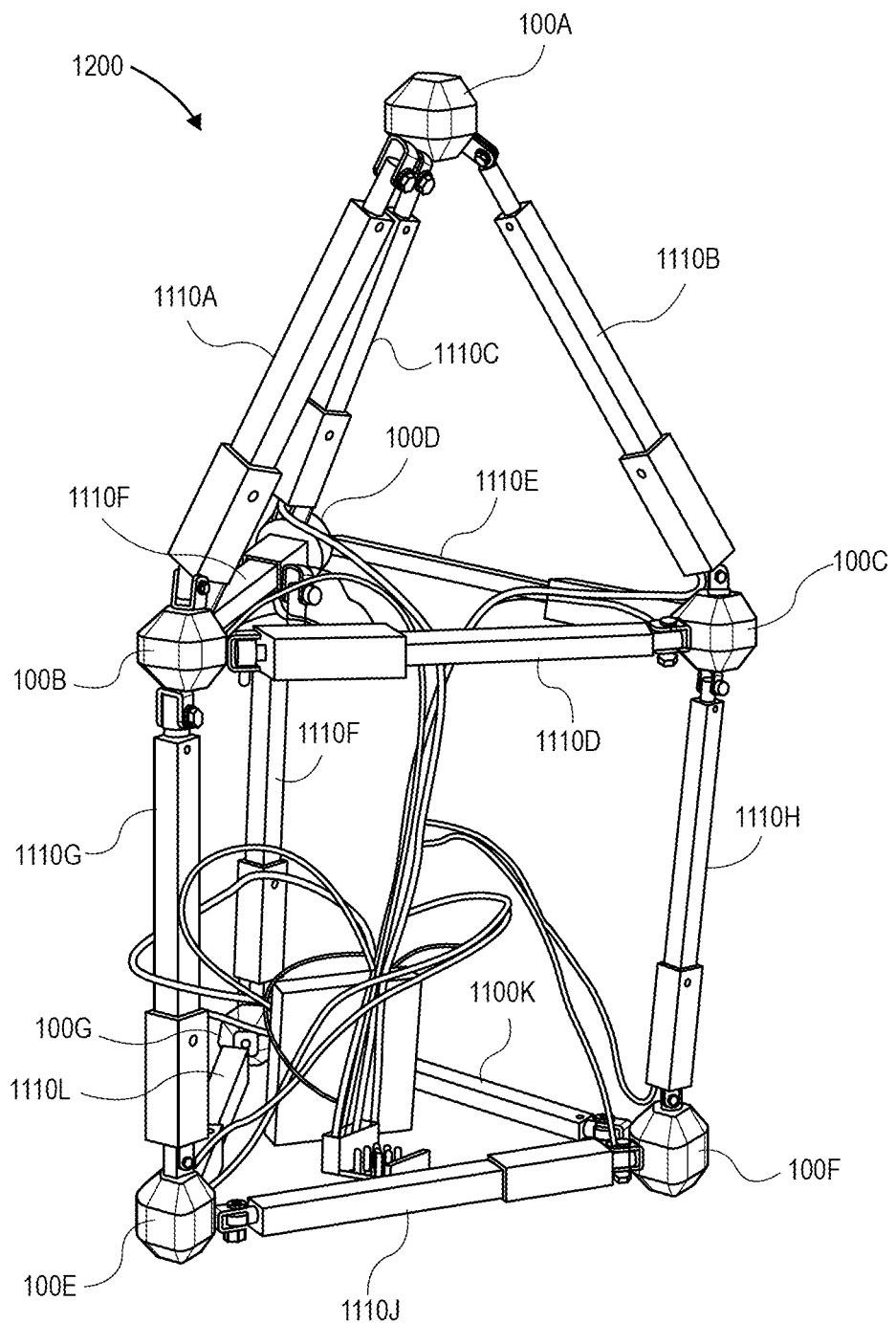
FIGS. 12A-12C illustrate perspective views of a truss structure including a plurality of spherical joints and linear actuators, according to an embodiment.
Figure 12B:
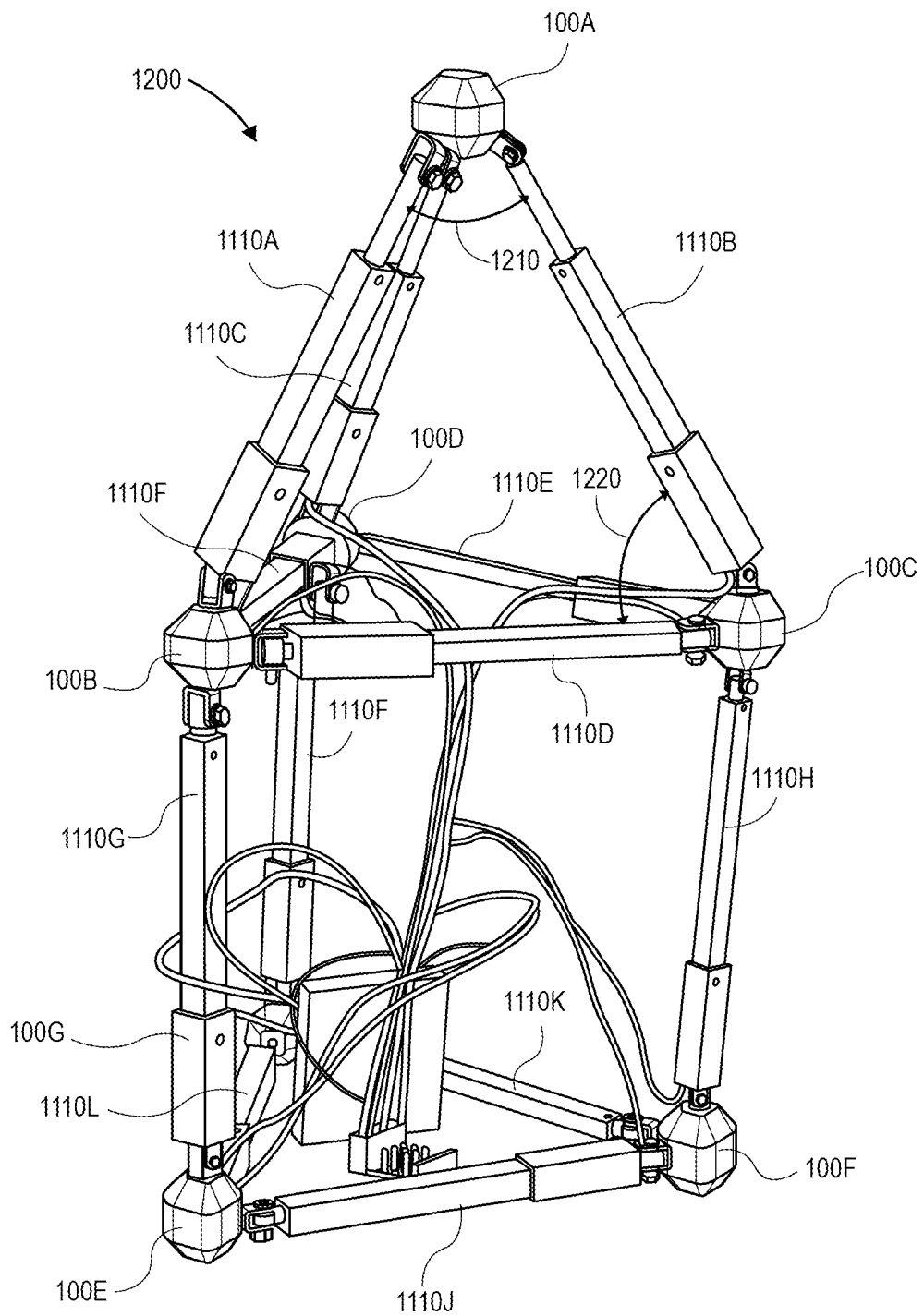
Figure 12C:
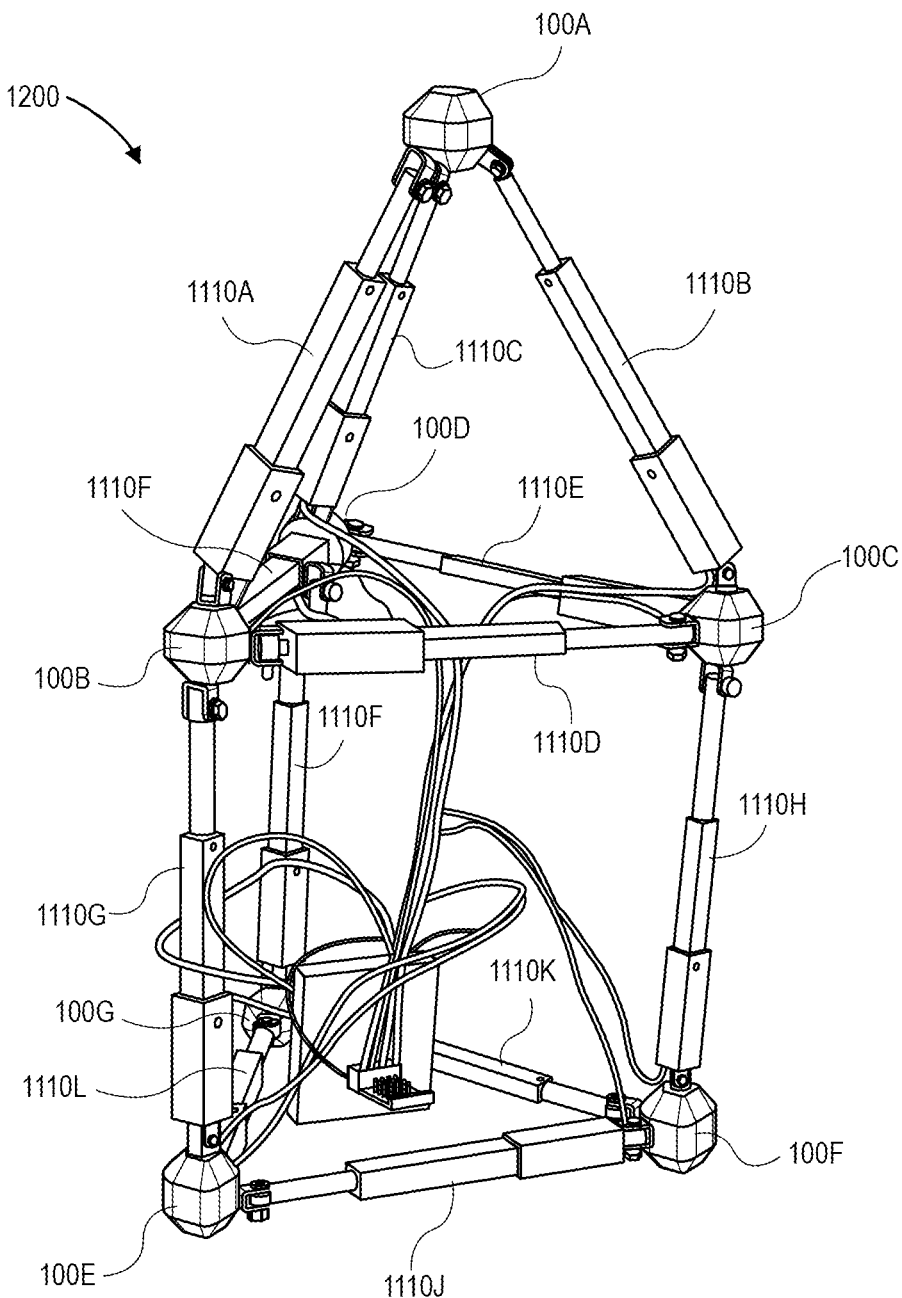

FIGS. 12A-12C illustrate perspective views of a truss structure 1200, according to an embodiment. The truss structure 1200 may include a plurality of spherical joints (seven are shown 100A-100G) and a plurality of actuators (twelve are shown: 1110A-1110L). Each spherical joint 100A-100G may be configured to be coupled to one or more actuators 1110A-1110L. For example, three of the rotatable members of the spherical joint 100A are coupled to the actuators 1110A-1110C, and four of the rotatable members of the spherical joint 100B are coupled to the actuators 1110A, 1110D, 1110F, 1110G.

In FIG. 12A, the actuators 1110A-1110L are in first (e.g., retracted) positions, and thus, the truss structure 1200 is in a first (e.g., collapsed) state. In FIG. 12B, the actuators 1110A-1110C have been actuated into second (e.g., extended) positions. As the actuators 1110A-1110C extend, the angles between the actuators 1110A-1110C may decrease. For example, the angle 1210 between the actuators 1110A and 1110B may decrease. The angles between the actuators 1110A-1110C and the actuators 1110D-1110F may increase. For example, the angle 1220 between the actuator 1110B and the actuator 1110D may increase.

In FIG. 12C, all of the actuators 1110A-1110L are in the extended position, and thus, the truss structure 1200 is in a second (e.g., expanded) state. This may also cause angles between the actuators 1110A-1110L to vary (when compared to FIGS. 12A and 12B). As mentioned above, the actuators 1110A-1110L may be coupled to the sleeves of the outer cups of the rotatable members, which may be configured to move (e.g., rotate) with respect to the shell of the spherical joint. This may allow the actuators 1110A-1110L to extend and retract, and the angles therebetween to vary, which may allow the truss structure 1200 to vary its shape and size.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A joint, comprising:
   a shell that is hollow and at least partially spherical, wherein the shell includes a plurality of shell rail sections including a first shell rail section, wherein the first shell rail section includes:
   a portion of an outer surface of the shell;
   a portion of an inner surface of the shell; and
   an opening edge section that defines a shell opening;
   a plurality of rotatable members including a first rotatable member, the first rotatable member including:
   an outer cup positioned at least partially outside of the shell and having an outer track surface; and
   an inner cup positioned at least partially inside of the shell and having an inner track surface;
   wherein the first shell rail section is positioned at least partially between the outer and inner track surfaces; and
   wherein the first rotatable member is configured to move along a first arcuate path with respect to the shell while a central longitudinal axis through the first rotatable member remains extending through a center of the shell.

2. The joint of claim 1, wherein the first arcuate path extends from a first rail location to a second rail location, and wherein the first and second rail locations are different circumferential locations around the first rail section.

3. The joint of claim 2, wherein the first rotatable member is movable in a plurality of arcuate paths including the first arcuate path and a second arcuate path, wherein the second arcuate path extends from a third rail location to a fourth rail location, wherein the third and fourth rail locations are on opposite sides of the first rail section, and wherein the central longitudinal axis remains extending through the center of the shell as the first rotatable member moves along the first and second arcuate paths.

4. The joint of claim 3, wherein the first and second arcuate paths are substantially perpendicular to one another.

5. The joint of claim 1, wherein the outer track surface and the inner track surface are at least partially spherical.

6. A spherical joint, comprising:
   a shell that is hollow and at least partially spherical, wherein the shell includes a first shell section and a second shell section that are configured to be coupled together, wherein the shell also includes a plurality of shell rail sections including a first shell rail section, wherein the first shell rail section includes:
   a portion of an outer surface of the shell;
   a portion of an inner surface of the shell; and
   a first opening edge section that defines a first shell opening;
   a plurality of rotatable members including a first rotatable member, the first rotatable member including:
   a first outer cup positioned at least partially outside of the shell and having an outer track surface, wherein the outer track surface is at least partially spherical and comprises a radius that is substantially the same as a radius of the outer surface of the shell; and
   a first inner cup positioned at least partially inside of the shell and having an inner track surface, wherein the inner track surface is at least partially spherical and comprises a radius that is substantially the same as a radius of the inner surface of the shell, and wherein a diameter of the first inner cup is greater than a diameter of the first shell opening such that the first inner cup is configured to be inserted into an interior of the shell prior to the first and second shell sections being coupled together;
   a first cup connector portion extending through the first shell opening and coupling the first outer cup and the first inner cup together; and
   a first rotatable member connector portion configured to couple the first rotatable member to an elongated member;
   wherein the first shell rail section is positioned at least partially between the outer and inner track surfaces; and
   wherein the first rotatable member is configured to move along a first arcuate path with respect to the shell while a central longitudinal axis through the first rotatable member remains extending through a center of the shell.

7. The spherical joint of claim 6, wherein the first inner cup comprises the first cup connector portion, and wherein the first cup connector portion is positioned at least partially within the first outer cup.

8. The spherical joint of claim 6, wherein the spherical joint does not comprise ball bearings.

9. The spherical joint of claim 6, wherein a degree of angular freedom between the central longitudinal axis through the first rotatable member and a central longitudinal axis through the first shell opening is from about 1° to about 30°.

10. The spherical joint of claim 9, wherein the degree of angular freedom is limited by the first inner cup, the first outer cup, or both contacting the first opening edge section.

11. The spherical joint of claim 6, wherein the first inner cup fully covers the first shell opening when the first inner cup is in a first position, and wherein the first inner cup does not fully cover the first shell opening when the first inner cup is in a second position.

12. The spherical joint of claim 6, wherein a diameter of the outer inner cup is greater than the diameter of the first shell opening, and wherein the first outer cup fully covers the first shell opening when the first outer cup is in a first position, and wherein the first outer cup does not fully cover the first shell opening when the first outer cup is in a second position.

13. The spherical joint of claim 6, wherein the plurality of rotatable members comprises a second rotatable member, the second rotatable member including:
  a second outer cup positioned at least partially outside of the shell;
  a second inner cup positioned at least partially inside of the shell;
  a second cup connector portion extending through a second shell opening in the shell and coupling the second outer cup and the second inner cup together; and
  wherein the second rotatable member is configured to move along a second arcuate path with respect to the shell while a central longitudinal axis through the second rotatable member remains extending through the center of the shell.

14. The spherical joint of claim 13, wherein a first bore extends through the first inner cup and the first outer cup, wherein a second bore extends through the second inner cup and the second outer cup, and wherein a cable is configured to extend into the interior of the shell through the first bore and then out of the interior of the shell through the second bore.

15. The spherical joint of claim 14, further comprising a cable guide positioned within the interior of the shell, wherein the cable guide comprises a first cable guide bore that is substantially aligned with the first bore, and wherein the cable guide also comprises a second cable guide bore that is substantially aligned with the second bore.

16. A truss structure, comprising:
  a plurality of joints including a first joint, wherein each joint comprises:
    a shell that is hollow and at least partially spherical, wherein the shell includes a plurality of shell rail sections including a first shell rail section and a second rail section, wherein the first and second shell rail sections each include:
      a portion of an outer surface of the shell;
      a portion of an inner surface of the shell; and
      an opening edge section that defines a shell opening;
    a plurality of rotatable members including a first rotatable member and a second rotatable member, wherein the first rotatable member is configured to move along a first arcuate path with respect to the shell while a central longitudinal axis through the first rotatable member remains extending through a center of the shell, wherein the second rotatable member is configured to move along a second arcuate path with respect to the shell while a central longitudinal axis through the second rotatable member remains extending through the center of the shell, and wherein the first and second rotatable members each include:
      an outer cup positioned at least partially outside of the shell and having an outer track surface; and
      an inner cup positioned at least partially inside of the shell and having an inner track surface, wherein the first shell rail section is positioned at least partially between the outer and inner track surfaces of the first rotatable member, and wherein the second shell rail section is positioned at least partially between the outer and inner track surfaces of the second rotatable member;
  a plurality of actuators including a first actuator and a second actuator;
  wherein the first actuator is coupled to the outer cup of the first rotatable member of the first joint, wherein the first actuator is configured to extend and retract, wherein the first rotatable member of the first joint and the first actuator are configured to move with respect to the shell of the first joint while the central longitudinal axis through first rotatable member of the first joint and the first actuator remains extending through the center of the shell of the first joint;
  wherein the second actuator is coupled to the outer cup of the second rotatable member of the first joint, wherein the second actuator is configured to extend and retract, wherein the second rotatable member of the first joint and the second actuator are configured to move with respect to the shell of the first joint while the central longitudinal axis through second rotatable member of the first joint and the second actuator remains extending through the center of the shell of the first joint.

17. The truss structure of claim 16, wherein first and second actuators are configured to extend, causing an angle between the first and second actuators to vary, thereby actuating the truss structure from a retracted state to an extended state.

18. The truss structure of claim 16, wherein the plurality of joints includes a second joint, wherein the first actuator is coupled to the outer cup of the first rotatable member of the second joint, wherein the first rotatable member of the second joint and the first actuator are configured to move with respect to the shell of the second joint while the central longitudinal axis through first rotatable member of the second joint and the first actuator remains extending through the center of the shell of the second joint.

19. The truss structure of claim 18, wherein the plurality of joints includes a third joint, wherein the second actuator is coupled to the outer cup of the first rotatable member of the third joint, wherein the first rotatable member of the third joint and the second actuator are configured to move with respect to the shell of the third joint while the central longitudinal axis through first rotatable member of the third joint and the second actuator remains extending through the center of the shell of the third joint.

20. The truss structure of claim 19, wherein the plurality of actuators includes a third actuator, wherein the third actuator is coupled to the outer cups of the second rotatable members of the second and third joints, wherein the second rotatable members of the second and third joints and the third actuator are configured to move with respect to the shells of the second and third joints while the central longitudinal axes through second rotatable members of the second and third joints and the third actuator remain extending through the centers of the shells of the second and third joints.

* * * * *